(12) United States Patent
Alford, Jr.

(10) Patent No.: US 7,266,823 B2
(45) Date of Patent: Sep. 4, 2007

(54) APPARATUS AND METHOD OF DYNAMICALLY REPARTITIONING A COMPUTER SYSTEM IN RESPONSE TO PARTITION WORKLOADS

(75) Inventor: Jack Allen Alford, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 10/082,746

(22) Filed: Feb. 21, 2002

(65) Prior Publication Data

US 2003/0158884 A1   Aug. 21, 2003

(51) Int. Cl.
*G06F 9/46* (2006.01)
*G06F 15/173* (2006.01)

(52) U.S. Cl. .................. 718/104; 718/100; 718/105; 709/223; 709/224; 709/226

(58) Field of Classification Search ........ 718/100–108; 709/223–226
See application file for complete search history.

(56) References Cited

U.S. PATENT DOCUMENTS

| 5,574,914 | A | 11/1996 | Hancock et al. | 395/650 |
| 6,154,787 | A | 11/2000 | Urevig et al. | 710/8 |
| 6,366,945 | B1 * | 4/2002 | Fong et al. | 718/104 |

OTHER PUBLICATIONS

*Dynamic Logical Partitioning in IBM eServer pSeries*, IBM Whitepaper "on-line", pp. I-9, Oct. 2002.
*Partitioning for the IBM eServer pSeries 690 System*, IBM Whitepaper "on-line" pp. I-8, Copyrighted 2001.
*Prediction-Based Dynamic Load-Sharing Heuristics*, by Kumar K. Goswami, Murthy Devarakonda and Ravishankar K. Iyer, IEEE Transactions on Parallel and Distributed Systems, vol. 4, No. 6, pp. 638-648 Jun. 1993.
*Cellular Disco: Resource Management Using Virtual Clusters on Shared-Memory Multiprocessors*, by Kinshuk Govil, Dan Teodosiu, Yongqiang Huang and Mendel Rosenblum, Operating Systems Review (SIGOPS), ACM Headquarter New York, vol. 33, No. 5, pp. 154-169, Dec. 1999.
*Dynamic Logical Partitioning on the AIX-PPC Platform*, by J. Jann, IBM Research "on-line", pp. 1-2, Feb. 2001.
*Solaris Resource Manager™ for the Solaris™ Operating Environment*, Sun Microsystems Inc., copyrighted 2001.
*Sun Enterprise™ 10000 Server: Dynamic System* Technical White Paper by Sun Microsystems, Inc. copyrighted 1999.
Edward Boden, Cesar Diniz Maciel and Richard Cutler *IBM e-server p-Series LPAR Technology Preview*, May 25, 2001.

* cited by examiner

*Primary Examiner*—Meng-Al T. Am
*Assistant Examiner*—Jennifer N. To
(74) *Attorney, Agent, or Firm*—Volel Emile; Mark E. McBurney; Libby Z. Handelsman

(57) ABSTRACT

A method, system and apparatus for dynamically repartitioning a partitioned computer system in response to workload demands are provided. In one embodiment, a monitoring software is used to monitor workloads on all resources in all the partitions. If a workload on a resource in a partition is determined to exceed a maximum threshold, a similar resource is allocated to the partition. The similar resource is preferentially an unassigned or unallocated resource. However, resources from other partitions may also be used. In another embodiment, a workload schedule is stored in a workload profile. If a scheduled workload in any of the resources of a partition is to exceed a maximum threshold, additional similar resources will be allocated to the partition before the scheduled workload.

20 Claims, 7 Drawing Sheets

APPARATUS AND METHOD OF DYNAMICALLY REPARTITIONING A COMPUTER SYSTEM IN RESPONSE TO PARTITION WORKLOADS

BACKGROUND OF THE INVENTION

1. Technical Field

The present invention is directed to a method and apparatus for managing a computer system. More specifically, the present invention is directed to a method and apparatus for dynamically repartitioning a computer system in response to partition workload.

2. Description of Related Art

Presently, many computer manufacturers design computer systems with partitioning capability. To partition a computer system is to divide the computer system's resources (i.e., memory devices, processors etc.) into groups; thus, allowing for a plurality of operating systems (OSs) to be concurrently executing on the computer system.

Partitioning a computer system may be done for a variety of reasons. Firstly, it may be done for consolidation purposes. Clearly consolidating a variety of computer systems into one by running multiple application programs that previously resided on the different computer systems on only one reduces (i) cost of ownership of the system, (ii) system management requirements and (iii) footprint size.

Secondly, partitioning may be done to provide production environment and test environment consistency. Once a new OS or application program has been tested and certified, the test partition may simply be designated as a production partition, with resources diverted to it as needed. This, in turn, may inspire more confidence that an application program that has been tested successfully will perform as expected.

Thirdly, partitioning a computer system may provide increased hardware utilization. For example, when an application program does not scale well across large numbers of processors, running multiple instances of the program on separate smaller partitions may provide better throughput.

Fourthly, partitioning a system may provide application program isolation. When application programs are running on different partitions, they are guaranteed not to interfere with each other. Thus, in the event of a failure in one partition, the other partitions will not be affected. Furthermore, none of the application programs may consume an excessive amount of hardware resources. Consequently, no application programs will be starved out of required hardware resources.

Lastly, partitioning provides increased flexibility of resource allocation. A workload that has resource requirements that vary over a period of time may be managed more easily if it is being run on a partition. That is, the partition may be easily altered to meet the varying demands of the workload.

Computer systems with partitioning capability generally use a partitioning management software. The partitioning management software is usually associated with the hardware of the system and interacts with a support processor embedded in the computer system. Thus, the partitioning management software is not part of the OS running on the computer system.

Nonetheless, it is well known that modern computer operating systems (OSs), such the Advanced Interactive Executive™ (AIX™) by the International Business Machines Corporation (IBM™), incorporate various methods of hardware resource management. AIX's primary resource management system is called a workload manager (WLM). WLM automatically assigns running processes to classes, then attempts to make system resources, such as CPU, memory and disk I/O bandwidth available according to the number of resource shares requested for the class. Alternatively, WLM can impose maximum limits on the number of resources made available to a class. Or, WLM can reserve for a class a minimum number of resources, even if the resources are not being used. Other OSs, such as Sun's Solaris, Hewlett Packard's HP-UX etc., provide similar capabilities.

Thus, hardware resource management and dynamic partitioning of a computer system are two approaches that may be used to make resources available to specific workloads when needed. A resource management software, such as WLM, may be used to respond to short-term fluctuations in resource demands, whereas a partitioning management software is used to commit resources on a longer-term basis.

Presently, the two approaches, (i.e., the resource management software and the partitioning management software) do not interact with each other in a way that combines their capabilities to enable the most efficient and flexible solution. For example, a critical application running in a partition that has one processor or CPU may consistently be approaching a maximum amount of CPU usage, even though other processors may sit idly, such as in the case where a CPU is not assigned to a partition. In this instance, WLM would not be able to provide additional CPU resources on its own, but would require the partitioning management software to assign additional CPUs to the partition. Currently, a system administrator has to repartition the computer system whenever this occurs. Having the system administrator handle this task is not as efficient as it would be if the computer system were to do so automatically.

Thus, what is needed is an apparatus and method of communicating information about peaks in resource demands from an operating system running in a partition to the partitioning management software such that the software can re-assign additional resources to the partition as needed.

SUMMARY OF THE INVENTION

The present invention provides a method, system and apparatus for dynamically repartitioning a partitioned computer system in response to workload demands. In one embodiment, a monitoring software is used to monitor workloads on all resources in all the partitions. If a workload on a resource in a partition is determined to exceed a maximum threshold, a similar resource is added to the partition. The similar resource is preferentially an unassigned or unallocated resource. However, if there is not a similar unallocated resource, the similar resource may be from another partition that has more than one of those similar resources (e.g., CPUs, I/O slots etc.), or a greater amount of the resource than is being used, (e.g., memory, bandwidth etc.) and the workload on the resources is within a minimum threshold.

In another embodiment, a workload schedule is stored in a workload profile. If a scheduled workload in any of the resources of a partition is to exceed a maximum threshold, additional similar resources will be allocated to the partition before the scheduled workload. Again, unallocated resources are preferentially used as the additional resources whenever possible. But if none are available, similar resources from donor partitions may be used provided that the donor partitions are able to do so (i.e., they have more than one of the similar resources or a greater amount than is being used and there is not a scheduled workload exceeding a threshold in the donor partitions).

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
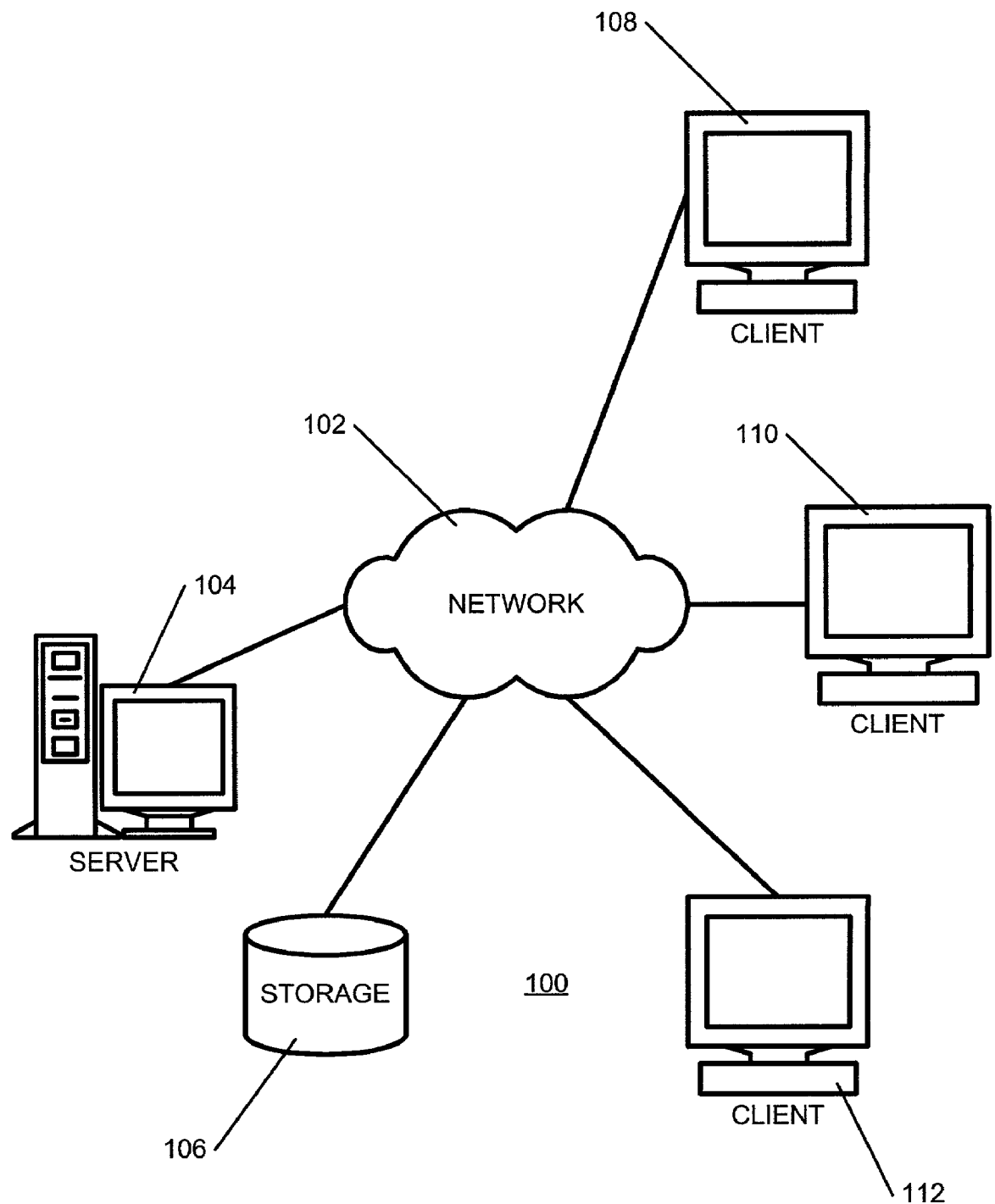
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
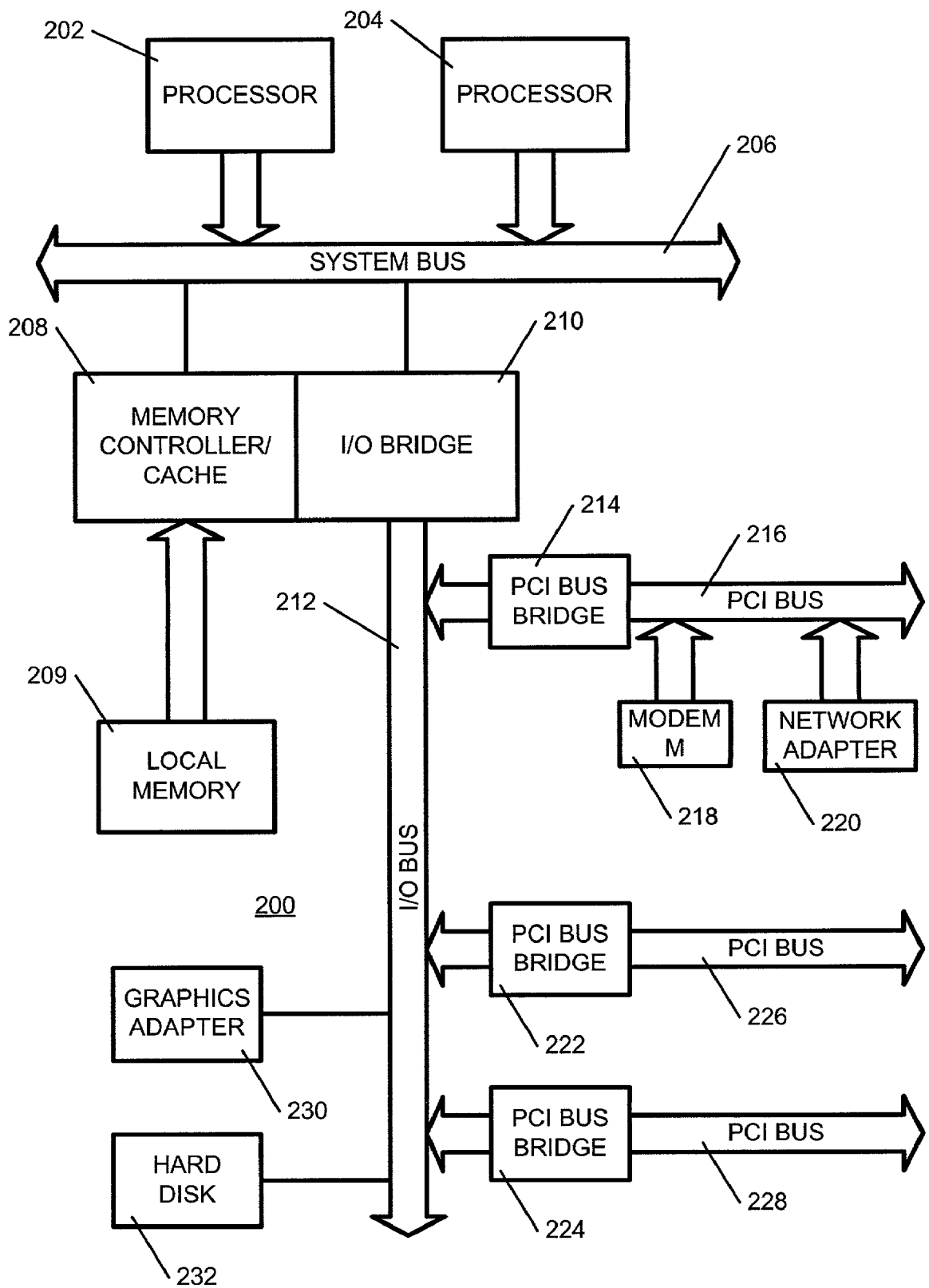
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or Linux operating system.

Figure 3:
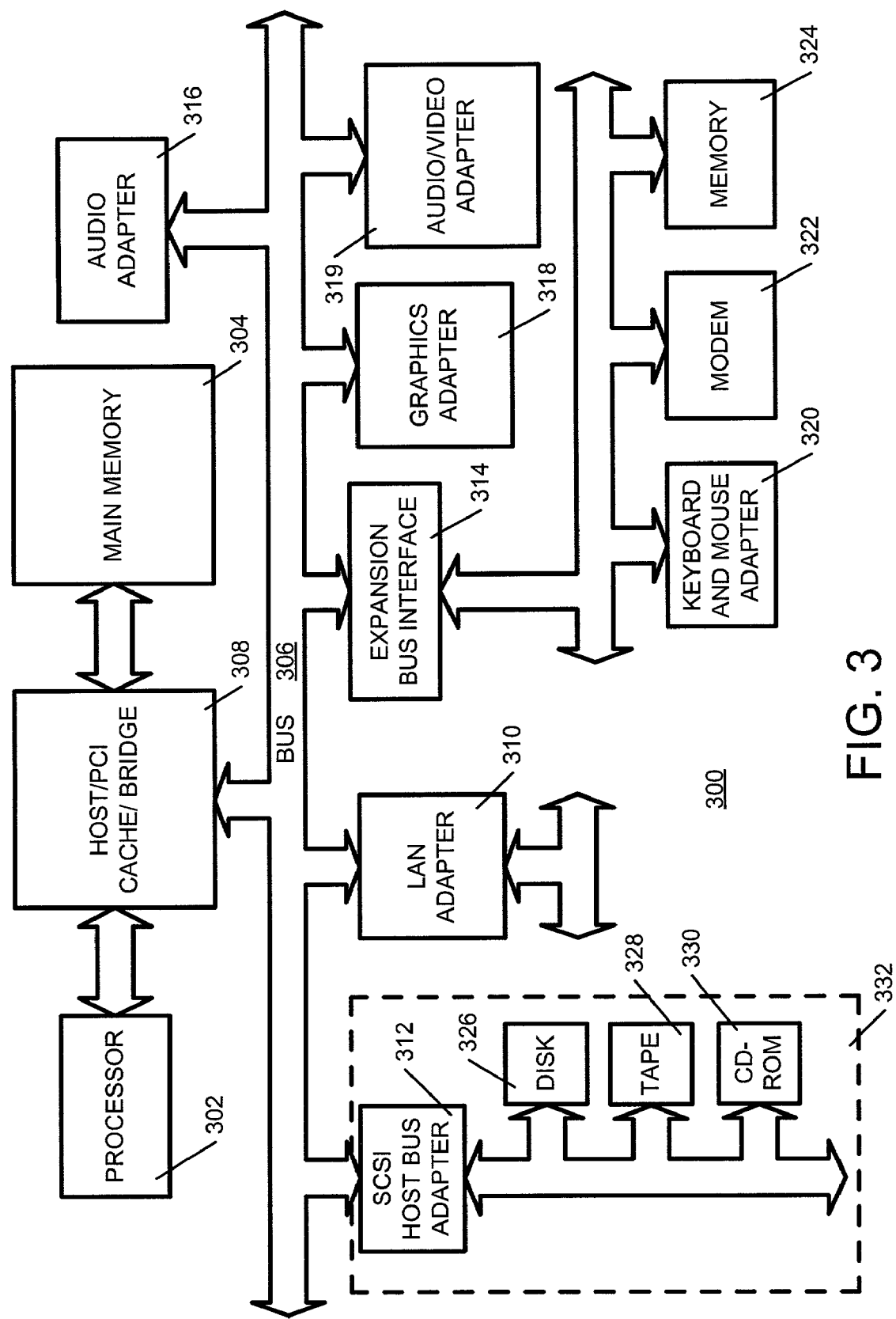
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of dynamically repartitioning a computer system in response to partition workloads. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

Figure 4:
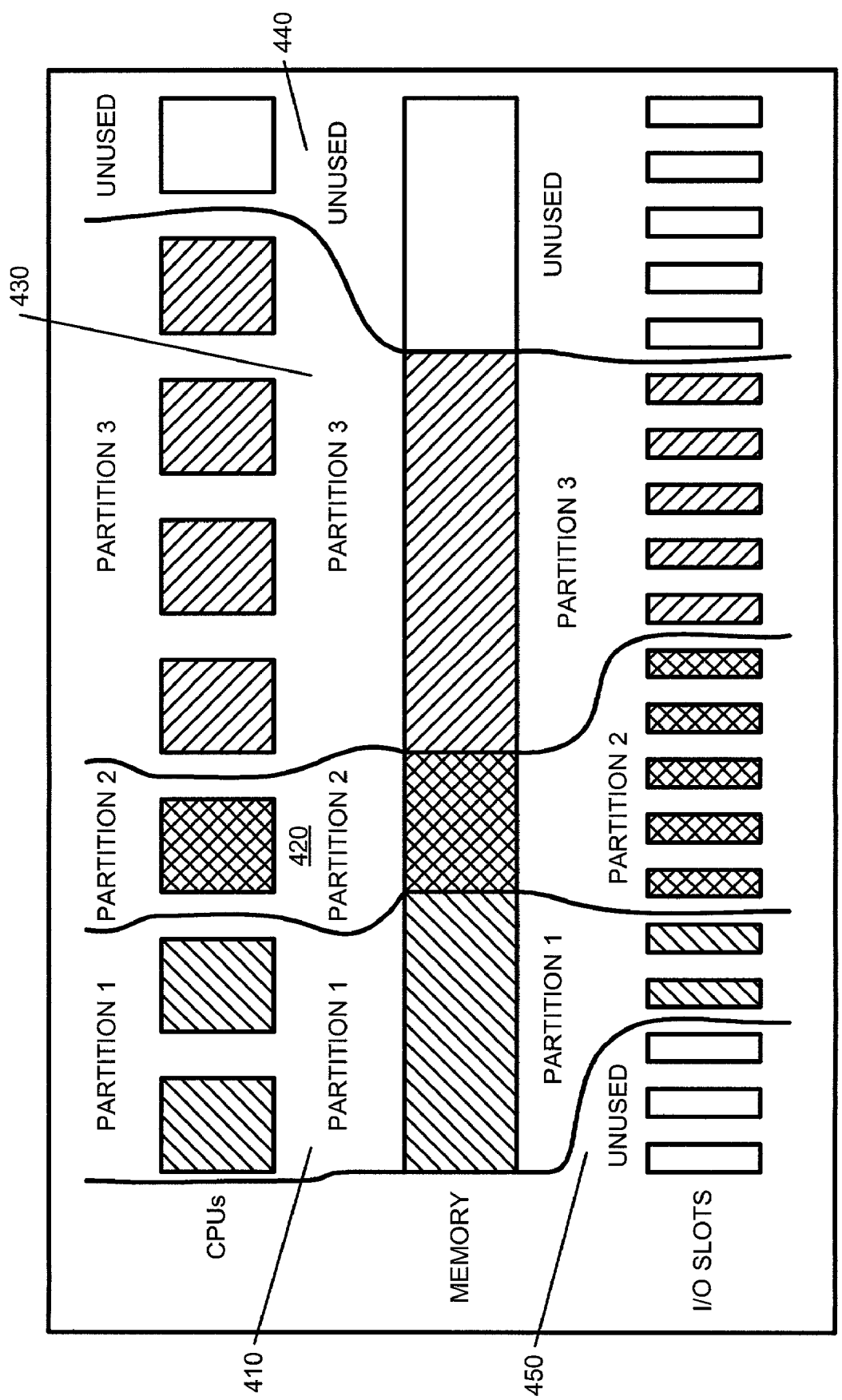
FIG. 4 illustrates logical a plurality of partitions of a computer system.

FIG. 4 illustrates a plurality of partitions of a computer system. Partition 1 410 has two (2) processors, two (2) I/O slots and use a percentage of the memory device. Partition 2 420 uses one (1) processor, five (5) I/O slots and also uses a smaller percentage of the memory device. Partition 3 430 uses four (4) processors, five (5) I/O slots and uses a larger percentage of the memory device. Areas 440 and 450 of the computer system are not assigned to a partition and are unused. Note that in FIG. 4 only subsets of resources needed to support an operating system are shown.

As shown, when a computer system is partitioned its resources are divided among the partitions. The resources that are not assigned to a partition are not used. More specifically, a resource may either belong to a single partition or not belong to any partition at all. If the resource belongs to a partition, it is known to and is only accessible to that partition. If the resource does not belong to any partition, it is neither known to nor is accessible to any partition. Note that one CPU may be shared by two or more partitions. In that case, the CPU will spend an equal amount of time processing data from the different partitions.

Figure 5:
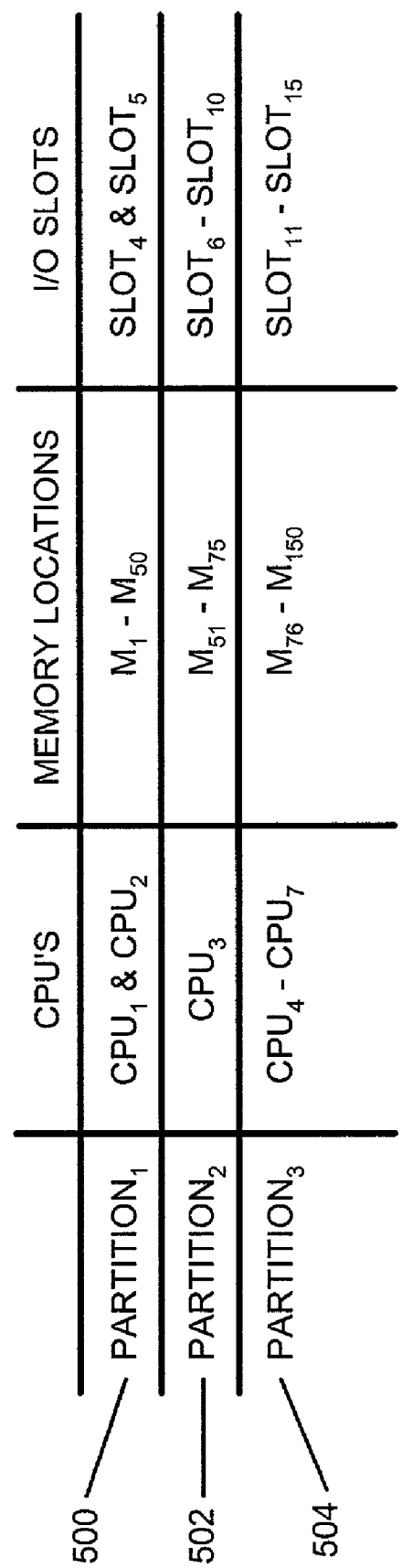
FIG. 5 illustrates a mapping table into which resources belonging to each partition are registered.

The computer system ensures that the resources assigned to one partition are not used by another partition through a mapping table that is managed by the partitioning management software. FIG. 5 illustrates such a table. In FIG. 5, $CPU_1$ and $CPU_2$, memory location 1 to memory location 50 (i.e., $M_1$-$M_{50}$) and input/output I/O $slot_4$ and I/O $slot_5$ are mapped to $partition_1$, 500. Likewise, $CPU_3$, $M_{51}$-$M_{75}$ and I/O $slot_6$ to I/O $slot_{10}$ are mapped to $partition_2$ 502 and $CPU_4$ to $CPU_7$, $M_{76}$-$M_{150}$ and I/O $slot_{11}$ to I/O $slot_{15}$ are mapped to $partition_3$ 504. As mentioned before, the last CPU ($CPU_8$ of FIG. 4), some of the memory locations and I/O $slot_1$ to I/O $slot_3$ and I/O $slot_{16}$ to I/O $slot_{20}$ are not assigned to any partition (see FIG. 4) and thus, are not in the table. Nonetheless, the partitioning management software is aware that they exist but are not presently assigned to any partition.

Note that FIGS. 4 and 5 are used as an example and should not be taken as being restrictive. Indeed, some existing computer systems are capable of supporting up to sixteen (16) partitions, each containing at least one CPU, one gigabyte of memory and one I/O slot.

As mentioned before, the partitioning management software may be running on a separate support processor. Using the software, a system administrator defines the partitions by specifying the number of CPUs, the amount of memory and the specific I/O slots that will be devoted to each partition. In dynamic partitioning, the administrator is able to add or remove processors, memory and/or I/O slots from a partition without interrupting the software running on the partition. The system administrator may also start or stop the OS running on any partition. All this may be done using a graphical user interface (GUI) or the resource management software command language. But in either case, it is a manual process.

Presently, the OS running on a partition does not send any information to the resource management software about the resources that are being used by that partition. The administrator may open a terminal and through various OS commands receive information about the usage of resources in use by a partition. For example, the administrator may want to find out whether a partition handling a large batch job is using a maximum percentage (e.g., 95%) of the allocated CPU resource. If so, the administrator may return to the resource management software interface to assign additional CPUs to the partition. If the batch job is run infrequently (i.e., once a month), the administrator may then return the additional CPUs to the partitions from which they were taken once the large job has been completed.

The present invention monitors the resource management software running in a partition to determine whether resources are being used at a value that approaches or exceeds maximum values specified in a table of the resource management software. If a resource overload lasting more than a threshold period of time is detected, the resource management software may locate resources that are either unallocated or that are allocated but are not being used and automatically assign or re-assign them to the overloaded partition.

Figure 6:
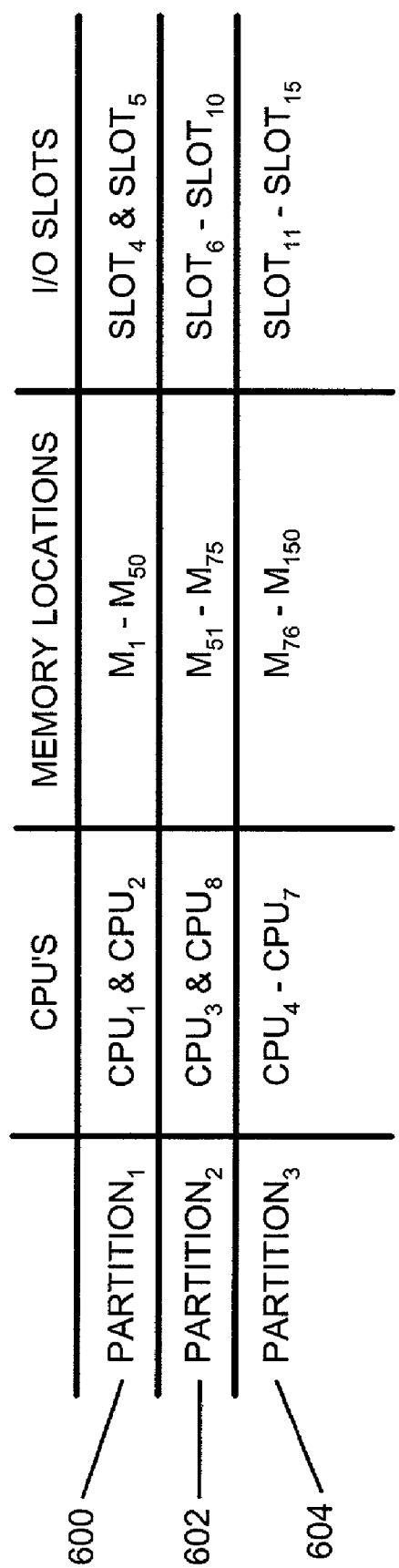
FIG. 6 depicts a modified mapping table of FIG. 5.

For example, suppose the resource management software, while monitoring resource usage by the partitions determines that partitions which is running a large batch job that is CPU intensive, has been using 95% of $CPU_3$'s processing capacity (95% being equal to or exceed a threshold amount of load on the CPU set by the system administrator) for an extended amount of time (i.e., a threshold amount of time that is again set by the system administrator), the resource management software may allocate the unused CPU (i.e., $CPU_8$ shown in FIG. 4) to partition$_2$. Thus, FIG. 5 will then be modified as shown in FIG. 6.

The resource management software may monitor the partitions by cycling through all the partitions in the system. To monitor a partition, the resource management software may open a virtual terminal session into that partition and repeatedly execute commands to return usage status of each of the resources in that partition. If excessive demands for a resource are noticed for a pre-defined amount of time, the resource management software may reallocate a similar underused resource from another partition or may, if available, allocate a similar unassigned resource to the partition.

Alternatively or in addition to the above-described embodiment of the invention, the resource management software may issue commands to the workload management software (i.e., the WLM) to change target, minimum or maximum resource values. For example, if the number of CPUs assigned to a partition is doubled, then the maximum percentage of CPU usage allowed for a class of processes may be lowered. In other words, the class of processes may use a smaller slice of a larger resource pool.

Furthermore, it may be possible to anticipate peak periods of resource demands through time-based and date-based profiles. In this case, the resource management software may re-deploy the resources in advance of the peak periods and then re-assign the resources back to their original partitions after the peak periods are over or after the workload on the resources reaches a minimum threshold or a scheduled period of time has elapsed. In the example of the monthly batch job described above, the date-based and/or time-based profile could specify that just before the batch job is to run each month, the partition running the job is to receive additional CPUs, memory and/or I/O slots. The profile may also specify that the added resources are to be returned to their original partitions after the batch job has terminated running.

Figure 7:
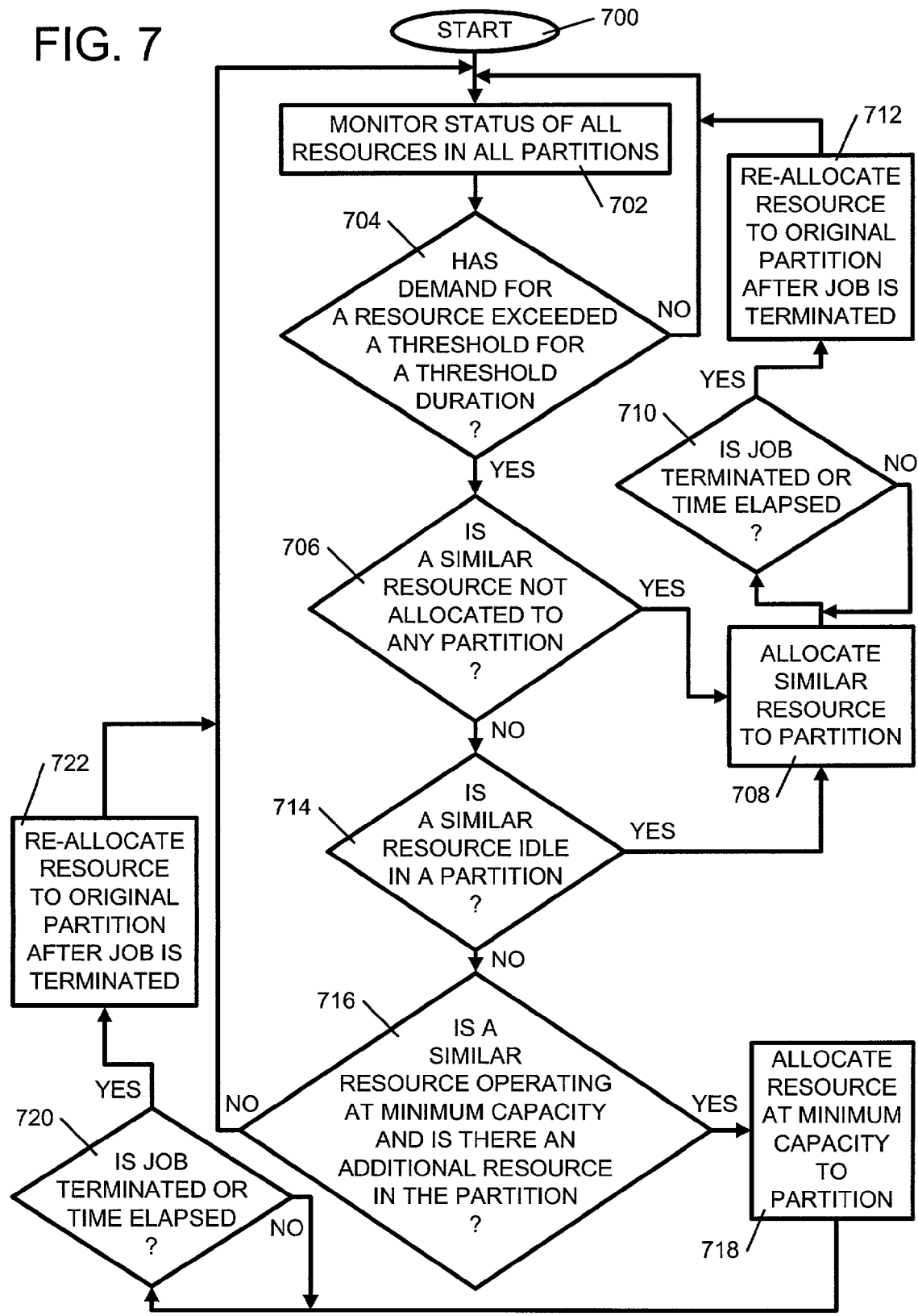
FIG. 7 is a flow chart of a process that may be used with the invention.

FIG. 7 is a process that may be used to dynamically assign or re-assign resources to overloaded partitions. The process starts when the computer system is turned on or when an administrator runs the process (step 700). When the process is running, it constantly monitors work status of all resources that assigned to the partitions. When it notices that demand for a resource exceeds a threshold set by the system administrator, it checks to see whether there exists a similar resource that is not assigned to any one of the partitions in the computer system. If so, it assigns the similar resource to the partition with the over-burdened resource. When the job is finished or when demand for the over-burdened resource is decreased to a minimum threshold, it de-allocates the resource from the partition (steps 702, 704, 706 708 and 710).

If there is not a similar resource that is not presently assigned to any partition, a check is made to determine whether there is a similar resource assigned to a partition that is either idle or is operating below a minimum threshold. If there is an idle resource or a resource operating below a minimum threshold, the resource is re-assigned to the partition with the over-burdened similar resource. Before, reassigning the resource, however, a check is made to ascertain that there is more than one similar resource in the partition from which the similar resource will be borrowed. If not, the resource will not be re-allocated. If a resource is re-allocated to the partition with the over-burdened resource, upon termination of the job or after a scheduled period of time has elapsed, the resource will be de-allocated from the partition and re-assigned to the original partition (steps 712, 708, 710, 714, 716 and 718).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of dynamically re-partitioning a partitioned computer system in response to workloads, each partition of the partitioned computer system having a plurality of resources and a minimum and a maximum percentage usage for each of the resources by each process being executed in each partition, the computer implemented method comprising the steps of:
   determining whether a workload on a resource in a partition exceeds a maximum threshold; and
   automatically allocating a similar resource to the partition if it is determined that the workload exceeds the maximum threshold, said automatically allocating step includes the step of automatically varying the minimum and the maximum percentage usage of the resource by each process executing in the partition.

2. The computer implemented method of claim 1 wherein the similar resource is a resource that has not been allocated to any partition.

3. The computer implemented method of claim 2 wherein the similar resource is de-allocated from the partition after the workload has decreased to a minimum threshold.

4. The computer implemented method of claim 1 wherein the similar resource is one of a plurality of similar resources that are allocated to another partition having a workload within a particular threshold.

5. The computer implemented method of claim 4 wherein the similar resource is de-allocated from the partition and re-assigned to the other partition after the workload has decreased to a minimum threshold.

6. A computer program product stored in a computer storage medium for dynamically re-partitioning a partitioned computer system in response to workloads, each partition of the partitioned computer system having a plurality of resources and a minimum and a maximum percentage usage for each of the resources by each process being executed in each partition, the computer program product comprising:
   code means for determining whether a workload on a resource in a partition exceeds a maximum threshold; and
   code means for automatically allocating a similar resource to the partition if it is determined that the workload exceeds the maximum threshold, said automatically allocating code means includes code means for automatically varying the minimum and the maximum percentage usage of the resource by each process executing in the partition.

7. The computer program product of claim 6 wherein the similar resource is a resource that has not been allocated to any partition.

8. The computer program product of claim 7 wherein the similar resource is de-allocated from the partition after the workload has decreased to a minimum threshold.

9. The computer program product of claim 6 wherein the similar resource is one of a plurality of similar resources that are allocated to another partition having a workload within a particular threshold.

10. The computer program product of claim 9 wherein the similar resource is de-allocated from the partition and re-assigned to the other partition after the workload has decreased to a minimum threshold.

11. An apparatus executing and dynamically re-partitioning a partitioned computer system in response to workloads, each partition of the partitioned computer system having a plurality of resources and a minimum and a maximum percentage usage for each of the resources by each process being executed in each partition, the apparatus comprising:

means for determining whether a workload on a resource in a partition exceeds a maximum threshold; and means for automatically allocating a similar resource to the partition if it is determined that the workload exceeds the maximum threshold, said automatically allocating means includes means for automatically varying the minimum and the maximum percentage usage of the resource by each process executing in the partition.

12. The apparatus of claim 11 wherein the similar resource is a resource that has not been allocated to any partition.

13. The apparatus of claim 12 wherein the similar resource is de-allocated from the partition after the workload has decreased to a minimum threshold.

14. The apparatus of claim 12 wherein the similar resource is one of a plurality of similar resources that are allocated to another partition having a workload within a particular threshold.

15. The apparatus of claim 14 wherein the similar resource is de-allocated from the partition and re-assigned to the other partition after the workload has decreased to a minimum threshold.

16. A computer system that is partitioned and having code data for dynamically re-partitioning Itself In response to workloads, each partition of the partitioned computer system having a plurality of resources and a minimum and a maximum percentage usage for each of the resources by each process being executed in each partition, the computer system comprising:

at least one storage device for storing the code data; and at least one processor for processing the code data to determine whether a workload on a resource in a partition exceeds a maximum threshold, to automatically allocate a similar resource to the partition if it is determined that the workload exceeds the maximum and to automatically vary the minimum and the maximum percentage usage of the resource by each process executing in the partition.

17. The computer system of claim 16 wherein the similar resource is a resource that has not been allocated to any partition.

18. The computer system of claim 17 wherein the similar resource is de-allocated from the partition after the workload has decreased to a minimum threshold.

19. The computer system of claim 16 wherein the similar resource Is one of a plurality of similar resources that are allocated to another partition having a workload within a particular threshold.

20. The computer system of claim 19 wherein the similar resource is de-allocated from the partition and re-assigned to the other partition after the workload has decreased to a minimum threshold.

* * * * *